(12) United States Patent
Yee et al.

(10) Patent No.: US 8,685,268 B1
(45) Date of Patent: Apr. 1, 2014

(54) METHOD OF FORMING TEXTURED SILICON SUBSTRATE BY MASKLESS CRYOGNIC ETCHING

(71) Applicant: United States of America as Represented by the Administrator of NASA, Washington, DC (US)

(72) Inventors: Karl Y. Yee, Pasadena, CA (US); Andrew P. Homyk, South Pasadena, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/895,499

(22) Filed: May 16, 2013

Related U.S. Application Data

(62) Division of application No. 13/017,174, filed on Jan. 31, 2011, now abandoned.

(51) Int. Cl.
*C23F 3/00* (2006.01)

(52) U.S. Cl.
USPC .................................................. 216/79; 216/67

(58) Field of Classification Search
None
See application file for complete search history.

(56) References Cited

U.S. PATENT DOCUMENTS

2011/0210811 A1* 9/2011 Scherer et al. ............... 335/306

* cited by examiner

*Primary Examiner* — Patrick Ryan
*Assistant Examiner* — Lucas J O Donnell
(74) *Attorney, Agent, or Firm* — Mark Homer

(57) ABSTRACT

Disclosed herein is a textured substrate comprising a base comprising silicon, the base having a plurality of needle like structures depending away from the base, wherein at least one of the needle like structures has a depth of greater than or equal to about 50 micrometers determined perpendicular to the base, and wherein at least one of the needle like structures has a width of less than or equal to about 50 micrometers determined parallel to the base. An anode and a lithium ion battery comprising the textured substrate, and a method of producing the textured substrate are also disclosed.

7 Claims, 1 Drawing Sheet

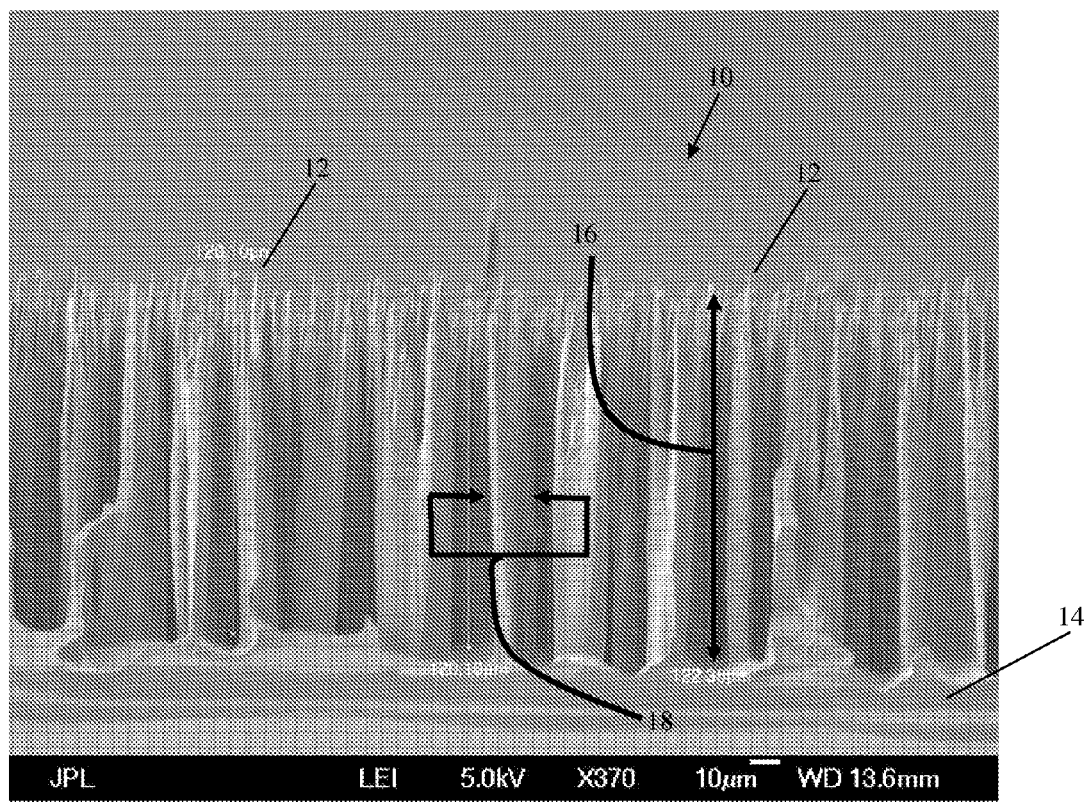

METHOD OF FORMING TEXTURED SILICON SUBSTRATE BY MASKLESS CRYOGNIC ETCHING

RELATION TO OTHER APPLICATIONS

This application is a division of, and claims priority to, U.S. patent application Ser. No. 13/017,174 filed Jan. 31, 2011, and applicants hereby request this priority date for all subject matter contained herein from said previously filed application, said previously filed application is also incorporated by reference herein.

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND OF THE INVENTION

The present invention relates generally to the fields of inductively coupled plasma (ICP) cryogenic etching of silicon to produce textured surfaces, and battery anodes employing such textured surfaces. Specifically, it concerns a lithium ion battery anode employing textured silicon, a method to produce such textured silicon, and lithium ion batteries utilizing such textured silicon anodes.

The energy demands of emerging portable electronic devices, plug-in hybrid electric vehicles and even space applications remain unfulfilled. More advanced energy storage devices are needed to accommodate the additional features in our portable devices, to minimize the emissions of greenhouse gases from automobiles or to enable more challenging space missions. The conventional lithium-ion cells utilize carbonaceous materials (nano-phase carbon, synthetic or natural graphite) as anodes, which have a maximum capacity of only 350 mAh/g, about one tenth of what would be available from the use of metallic lithium anode. The use of metallic lithium, however, is problematic mainly due to the safety and reliability issues associated with its morphological changes upon cycling. The focus has therefore been on the use of lithium alloys, as a compromise. Among the various elements that can be used as (alloy) anodes for lithium, silicon is the most promising system, because of its ability to react with 4 Li atoms per Si atom, which results in an impressive theoretical capacity of 4200 mAh/g.

The use of silicon for the anode of Li ion batteries is attractive, as it has the highest theoretical charge capacity of any material when used as an anode in a Li ion cell. However, the large volume expansion/contraction of bulk Si upon absorption and desorption of Li ions results in pulverization of the anode after several charge and discharge cycles.

U.S. Pat. Nos. 7,02,829 and 7,683,359 to Green (Green) are generally directed to a silicon/lithium battery to be produced as an integrated unit on a chip. The battery includes an anode formed from an array of submicron structures including silicon fabricated on a substrate and a cathode including lithium. Green is similar to numerous references in which the textured surface, in this case an anode, comprises "nano-wires" which are grown, etched, or otherwise attached to the surface. This approach, however fails to achieve the full potential of lithium ion batteries. The nano-wires are known to separate from the substrate and are random in arrangement on the surface.

U.S. Pat. No. 7,622,377 to Lee et al. (Lee) is generally directed to a microfeature workpiece substrate having through-substrate vias, and associated methods of formation. A method in accordance with one embodiment for forming a support substrate for carrying microfeature dies includes exposing a support substrate to an electrolyte, with the support substrate having a first side with a first conductive layer, a second side opposite the first side with a second conductive layer, and a conductive path extending through the support substrate from the first conductive layer to the second conductive layer. The method can further include forming a bond pad at a bond site of the first conductive layer by disposing at least one conductive bond pad material at the bond site, wherein disposing of at least one conductive bond pad material can include passing an electrical current between the first and second conductive layers via the conductive path, while the substrate is exposed to the electrolyte.

Lee is an example of a multitude of references which disclose various methods and approaches of etching silicon and other substrates to produce a desired effect. Lee and other similar references utilize a mask to produce the desired effect.

U.S. Pat. No. 6,033,928 to Eriguchi, et al. (Eriguchi) is generally directed to forming a silicon dioxide film on a silicon substrate and than forming hemispherical grains made of silicon, each having an extremely small diameter, which are deposited thereon by LPCVD. After annealing the hemispherical grains, the silicon dioxide film is etched using the hemispherical grains as a first dotted mask, thereby forming a second dotted mask composed of the silicon dioxide film. The resulting second dotted mask is used to etch the silicon substrate to a specified depth from the surface thereof, thereby forming an aggregate of semiconductor micro-needles. Eriguchi forms the substrate utilizing a "mask" in the form of the "dotted mask" applied to the silicon substrate.

U.S. Pat. No. 7,700,235 to Konishiike et al. (Konishiike) is generally directed to a battery capable of improving cycle characteristics. An anode active material layer is formed by a vapor phase method, and includes Si as an element. In the anode active material layer, a plurality of primary particles formed by growth in a thickness direction are included, and the plurality of primary particles are agglomerated to form a plurality of secondary particles. Each secondary particle is separated by a groove formed by charge and discharge, and some of primary particles are split particles split by the groove. The average number of the split particles per secondary particle in 5 or more adjacent secondary particles is 10 or more. Moreover, the primary particles and the secondary particles are inclined to the same side.

Konishiike utilizes an anode comprising a plurality of agglomerated materials on a substrate which dissipate the stress due to expansion and shrinkage according to charge and discharge. However, the anodes produced according to Konishiike do not achieve the full potential of lithium ion batteries.

U.S. Pat. No. 7,442,629 to Mazur et al. (Mazur) is generally directed to semiconductor substrates having submicron-sized surface features generated by irradiating the surface with ultra short laser pulses. In one aspect, a method of processing a semiconductor substrate is disclosed that includes placing at least a portion of a surface of the substrate in contact with a fluid, and exposing that surface portion to one or more femtosecond pulses so as to modify the topography of that portion. The modification can include, e.g., generating a plurality of submicron-sized spikes in an upper layer of the surface. Mazur forms the various substrates by vaporizing parts of the surface. As such, the surface produced according to the disclosure is not crystalline, but is instead a plurality of amorphous domains. The substrate produced by Mazur have surface features with heights of less than about 1 micrometer.

U.S. Pat. No. 5,501,893 to Laermer et al. (Laermer) is generally directed to a method of anisotropic plasma etching of silicon to provide laterally defined recess structures therein through an etching mask employing a plasma, the method including anisotropic plasma etching in an etching step a surface of the silicon by contact with a reactive etching gas to removed material from the surface of the silicon and provide exposed surfaces; polymerizing in a polymerizing step at least one polymer former contained in the plasma onto the surface of the silicon during which the surfaces that were exposed in a preceding etching step are covered by a polymer layer thereby forming a temporary etching stop; and alternatively repeating the etching step and the polymerizing step. The method provides a high mask selectivity simultaneous with a very high anisotropy of the etched structures.

Other references include Marcel W. Pruessner, Williams S. Rabinovich, Todd H. Stievater, Doewon Park, and Jeffrey W. Baldwin "Cryogenic Etch Process Development for Profile Control of High Aspect-Ratio Submicron Silicon Trenches", J. Vac Sci. Technol. B 25(1) (2007) pp. 21-28; referred to as Pruessner et al. (Pruessner.) Pruessner is generally directed to developments in the cryogenic dry-etch process to produce silicon photonics and MEMS/NEMS. A cryogenic etch process using low temperature (T less than or equal to $-100°$ C. and $SF_6$ and $O_2$ gases is presented for fabricating high aspect ratio silicon microstructures, including photonic devices and micro- and nanoelectromechanical systems. The process requires only a single electron beam resist mask. Pruessner discloses optimized processes using low temperature (T=$-110°$ and low chamber pressure (P=7 mTorr) which enable sidewall verticality greater than $89.5°$ with roughness of 1-10 nm. Pruessner discloses an alternative dry etch process to the so-called Bosch process. In the Bosch process, an etch step ($SF_6$ gas) and a passivation step ($C_4F_8$) alternate every few seconds. The two steps are repeated to achieve the desired etch depth. In the process disclosed by Pruessner, the two processes occur simultaneously, at low temperatures (i.e., less than or equal to about $-100°$ C.

Kanwar S. Nalwa, and Sumit Chaudhary, "Design of Light-Trapping Microscale-Textured Surfaces for Efficient Organic Solar Cells", Optics Express, Vol. 18, No. 5, (2010) pp. 5168-5178; (Kanwar) is generally directed to light-trapping microscale-textured surfaces which absorb photonic energy. Kanwar disclosed substrates comprising a number of different layers which have been etched to produce a textured surface. The micro-textured surfaces have a height of about 2 microns and a pitch of about 1.5 microns.

Meint J. de Boer, J. G. E. Gardeniers, Henri V. Jansen, Edwin Smulders, Melis-Jan Gilde, Gerard Roelofs, Jay N. Sasserath, and Miko Elwenspock, "Guidelines for Etching Silicon MEMS Structures Using Fluorine High-Density Plasmas at Cryogenic Temperatures", J. Micromech. Sys. Vol. 11, No. 4 (2002) pp. 385-401; (de Boer) is generally directed to the presentation of guidelines for the deep reactive ion etching (DRIE) of silicon MEMS structures, employing $SF_6/O_2$-based high-density plasmas at cryogenic temperatures. Procedures of how to tune the equipment for optimal results with respect to etch rate and profile control are described. Profile control is a delicate balance between the respective etching and deposition rates of a SiOF passivation layer on the sidewalk and bottom of an etched structure in relation to the silicon removal rate from unpassivated areas. Any parameter that affects the relative rates of these processes has an effect on profile control. The deposition of the SiOF layer is mainly determined by the oxygen content in the $SF_6$ gas flow and the electrode temperature. Removal of the SiOF layer is mainly determined by the kinetic energy (self-bias) of ions in the $SF_6/O_2$ plasma. Diagrams for profile control are given as a function of parameter settings, employing the previously published "black silicon method". Parameter settings for high rate silicon bulk etching, and the etching of micro needles and micro moulds are discussed, which demonstrate the usefulness of the diagrams for optimal design of etched features. De Boer thus presents general guidelines directed to avoiding formation of black silicon.

KR 20060117109 to Sun et al. (Sun) is generally directed to a silicon anode active material for a lithium secondary battery, which shows high electroconductivity and low electric resistance, undergoes a reduced change in volume upon charge/discharge, and imparts high output, high capacity and improved lifespan to a lithium secondary battery. The silicon anode active material for a lithium secondary battery is obtained by the method comprising the steps of: mechanically mixing and pulverizing silicon particles and cellulose-like vegetable fibers to allow the surface of the silicon particles to be coated with the vegetable fibers; and heat treating the silicon particles coated with the vegetable fibers under a reductive atmosphere or inert atmosphere to perform carbonization of the surface of the silicon particles.; The cellulose-like vegetable fibers are mixed with the silicon particles in a ratio of 0.1-10 per weight of the silicon particles.

Accordingly, there is a long felt need in the art to produce silicon anodes for lithium ion batteries which are not plagued by the effect of pulverization and other forces which limit the specific energy capabilities of the anode. Even if a fraction of this high capacity is realized and retained upon cycling, this will result in a significant enhancement in the specific energy. With a capacity of ~1000 mAh/g, for example, the projected specific energy would allow for lithium ion batteries capable of over 200 Wh/kg.

SUMMARY OF THE INVENTION

In one aspect of the present invention, a textured substrate comprises a base comprising silicon, the base having a plurality of needle like structures depending away from the base, wherein at least one of the needle like structures has a depth of greater than or equal to about 50 micrometers determined perpendicular to the base, and wherein at least one of the needle like structures has a width of less than or equal to about 50 micrometers determined parallel to the base.

In another aspect of the present invention, a method of producing a textured substrate comprises the steps of inductively coupled plasma (ICP) cryogenically etching a base substrate comprising silicon at a temperature of less than or equal to about $-140°$ C. by contacting the surface with an inductively coupled plasma comprising $SF_6$ and $O_2$ gas, without a mask, at a pressure and for a period of time sufficient to produce a plurality of needle like structures depending perpendicularly away from the base, wherein at least one of the needle like structures has a depth of greater than or equal to about 50 micrometers determined perpendicular to the base and a width of less than or equal to about 50 micrometers determined parallel to the base.

In another aspect of the present invention, an anode for a lithium ion battery comprises a textured substrate comprising a base comprising silicon, the base having a plurality of needle like structures depending perpendicularly away from the base, wherein at least one of the needle like structures has a depth of greater than or equal to about 50 micrometers determined perpendicular to the base and a width of less than or equal to about 50 micrometers determined parallel to the base, wherein at least a portion of the needle like structures are formed from the base.

In another aspect of the present invention, a lithium ion battery comprises an anode comprising a base comprising silicon, the base having a plurality of needle like structures depending perpendicularly away from the base, wherein at least one of the needle like structures has a depth of greater than or equal to about 50 micrometers determined perpendicular to the base and a width of less than or equal to about 50 micrometers determined parallel to the base, wherein at least a portion of the needle like structures are formed from the base.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is an electron micrograph showing a textured substrate according to the instant disclosure.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

In the following description, numerous specific details are set forth to provide a thorough understanding of the present invention. However, it will be obvious to those skilled in the art that the present invention may be practiced without such specific details. In other instances, well-known devices have been shown in block diagram form in order not to obscure the present invention in unnecessary detail. For the most part, derails unnecessary to obtain a complete understanding of the present invention have been omitted in as much as such details are within the skills of persons of ordinary skill in the relevant art.

In keeping with long-standing patent law convention, the words "a" and "an" when used in the present specification in concert with the word comprising, including the claims, denote "one or more". Description in which the term "comprising" is used may also include more limiting embodiments such as "consisting essentially of" and "consisting of". The term comprising is used herein for brevity.

Broadly, the present invention generally provides a textured substrate comprising a base comprising silicon, the base having a plurality of needle like structures depending away from the base, wherein at least one of the needle like structures has a depth of greater than or equal to about 50 micrometers determined perpendicular to the base, and wherein at least one of the needle like structures has a width of less than or equal to about 50 micrometers determined parallel to the base, and a method of making the textured substrate. The textured substrate may be an anode of a lithium ion battery.

In an embodiment, the textured substrate has the morphology referred to in the art as "black silicon". In particular, black silicon having a depth of greater than or equal to about 50 micrometers, which is on the order of 20 times deeper than black silicon known in the art. This texturing produces an anode having improved properties for use as an anode in a lithium ion battery. In texturing the anode according to the instant disclosure to produce a substrate having the morphology of black silicon, the surface area is greatly increased. The increase in surface area of the substrate increases the kinetic rates (and thus the charging rate) of a lithium ion battery comprising this anode, and the parallel structure of the needles facilitate transport processes due to decreased tortuosity.

Furthermore, the black silicon needle like structures, e.g., spikes, are able to accommodate the stresses of charging due to a radial expansion and contraction of Li ions during the absorption and desorption of the charging cycle. As a result, the needle like structures of a substrate according to the instant disclosure are able to circumvent the pulverization issues which typically plague the use of silicon as an anode material. In addition, the microscale texturing as disclosed herein avoids the generation of excess SEI (solid electrolyte interphase), which has inhibited the ability to produce a practical (>2.5 volt) battery employing nanoscale texturing of the anode. Accordingly, an embodiment, the textured substrate disclosed herein, having a micro-scale and/or nano-scale textured silicon substrate, is suitable for use as an anode for a high capacity, rapid charge rate Li ion battery.

In an embodiment, the use of cryogenic etching using inductively coupled plasma (ICP) according to the instant disclosure results in a method to rapidly and repeatedly produce a micro-scale and/or nano-scale textured silicon substrate (e.g., black silicon), which is suitable for use as an anode, over a relatively large area and in a cost effective manner.

In an embodiment, the textured substrate comprises a base comprising silicon. The base comprises a plurality of needle-like structures (e.g., spikes) depending away from the base. In other words, the base comprises a plurality of needle-like structures extending laterally away from the base. In an embodiment, at least one of the needle like structures has a depth of greater than or equal to about 50 micrometers, determined perpendicular to the base from the top of the needle like structure to the base. In other words, in an embodiment, at least one of the needle like structures has a height of greater than or equal to about 50 micrometers, determined perpendicular to the base from the base to the top of the needle like structure. In an embodiment, at least one of the needle like structures has a width of less than or equal to about 50 micrometers, determined parallel to the base. Preferably, at least one of the needle like structures has a maximum width of less than or equal to about 50 micrometers determined parallel to the base at any point along the needle like structure from the base to the top of the needle like structure.

In an embodiment, the textured substrate comprises a base comprising silicon. Preferably, the textured substrate consists essentially of silicon. The base of the textured substrate may comprise crystalline silicon, amorphous silicon, polysilicon, or a combination thereof. In an embodiment, the textured substrate consists essentially of amorphous silicon. In another embodiment, the textured substrate consists essentially of polysilicon. In a preferred embodiment, the textured substrate consists essentially of cyrstalline silicon. In an embodiment, the textured substrate may further comprise at least one additional element selected from Groups 1 to 17 of the periodic table.

In an embodiment, at least one of the needle-like structures has a depth determined perpendicular to the base from the top of the needle like structure to the base of greater than or equal to about 75 micrometers, preferably greater than or equal to about 100 micrometers, preferably greater than or equal to about 125 micrometers, preferably greater than or equal to about 150 micrometers, preferably greater than or equal to about 175 micrometers, preferably greater than or equal to about 200 micrometers, preferably greater than or equal to about 300 micrometers, preferably greater than or equal to about 400 micrometers, preferably greater than or equal to about 500 micrometers, preferably greater than or equal to about 600 micrometers, preferably greater than or equal to about 700 micrometers, preferably greater than or equal to about 800 micrometers, preferably greater than or equal to about 900 micrometers, preferably greater than or equal to about 1000 micrometers.

In an embodiment, at least one of the needle like structures has a maximum width determined parallel to the base at any point along the needle like structure from the base to the top of the needle like structure of less than or equal to about 40 micrometers, preferably less than or equal to about 30 micrometers, preferably less than or equal to about 25 micrometers, preferably less than or equal to about 20 micrometers, preferably less than or equal to about 15 micrometers, preferably less than or equal to about 10 micrometers.

The needle-like structures are preferably formed directly from the base. As such, the needle-like structures are not "attached" to the base, but instead are formed from the base, which results in a robust textured surface. This important distinction prevents the needle-like structures from becoming separated from the base (losing their attachment) under conditions which would otherwise cause appendages from becoming dislodged (unattached) from substrates known in the art. For example, carbon nanotubes, nanowires, and the like, often lose attachment to a surface due to physical abrasion. Such surfaces also become unstable when they become "wet" (contacted with water or other liquids.) However, the textured substrate according to the instant disclosure is stable in liquid environments. The needle-like structures do not lose attachment to the base nor collapse when contacted with either an aqueous or a non-aqueous liquid.

Formation of Textured Substrate

The textured substrate disclosed herein may be produced using a method comprising the step of inductively coupled plasma (ICP) etching at cryogenic temperatures without using a mask. In an embodiment, the textured substrate is produced by ICP cryogenically etching a base substrate comprising silicon at a temperature of less than or equal to about −140° C. by contacting the surface with an inductively coupled plasma comprising $SF_6$ and $O_2$ gas, without a mask, at a pressure and for a period of time sufficient to produce a plurality of needle like structures depending perpendicularly away from the base, wherein at least one of the needle like structures has a depth of greater than or equal to about 50 micrometers determined perpendicular to the base and a width of less than or equal to about 50 micrometers determined parallel to the base.

The method utilized herein is in contrast to the so-called Bosch process, wherein a base is etched using ICP, followed by application of a passivation (e.g., a Teflon coating), which is once again followed by an ICP etch. These two steps are conducted over and over again until the desired texturing is achieved. However, unlike the process described herein, the depth of the structures produced using the Bosch or a related process is typically limited to less than 10 micrometers, and cannot produce large, contiguous areas of black silicon as may be produced according to this disclosure.

The instant method is thought to produce a "passivation" layer in-situ as the etch process proceeds. As the silicon-containing base is contacted with $SF_6$ and $O_2$ gas at cryogenic temperatures during the ICP etch process, the SiOF byproduct formed is thought to form an in-situ "mask" on the substrate which results in the needle-like structures of the textured substrate described herein. The result is not only a new and novel textured substrate, but in-addition, the instant method provides for a facile and inexpensive process capable of producing this new and novel textured substrate in great quantity using known equipment.

In an embodiment, the steps of ICP cryogenically etching a base substrate comprising silicon at a temperature of less than or equal to about −140° C. include contacting the surface with an inductively coupled plasma comprising $SF_6$ and $O_2$ gas, without a mask, at a pressure and for a period of time sufficient to produce a plurality of needle like structures depending perpendicularly away from the base, the steps comprise a first step of etching a base substrate under conditions sufficient to create a high density stubble of black silicon across the surface of the substrate followed by a second step of etching the base substrate employed a higher forward power than the first step under conditions sufficient to increase the depth of the etch relative to the first step.

The temperature at which the process is conducted is critical to producing the textured substrate disclosed herein. Interestingly, the lower temperatures required by the instant disclosure are in contrast to common-knowledge in the art, which are directed to higher temperatures to produce vertical sidewalls in a substrate. In an embodiment, the textured substrate according to the instant disclosure is produced by ICP etching of a base substrate comprising silicon by contacting the surface with an inductively coupled plasma comprising $SF_6$ and $O_2$ gas, without a mask, at a temperature of less than or equal to about −140° C., preferably less than or equal to about −150° C., preferably less than or equal to about −160° C., preferably less than or equal to about −170° C., preferably less than or equal to about −180° C., preferably less than or equal to about −190° C., preferably less than or equal to about −200° C., to produce a plurality of needle like structures depending perpendicularly away from the base, wherein at least one of the needle like structures has a depth of greater than or equal to about 50 micrometers determined perpendicular to the base and a width of less than or equal to about 50 micrometers determined parallel to the base.

The method disclosed herein produces an optically black substrate having micro-texturing and/or nano-texturing. In an embodiment, the substrate may include "doped" silicon, which comprises at least one element other than silicon selected from Groups 1-17 of the periodic table of elements. The base substrate may also comprise a plurality of layers, each comprising silicon.

In an embodiment, the cryogenic ICP etching of a base substrate comprises contacting the silicon containing base with an inductively coupled plasma comprising $SF_6$ and $O_2$ gas. The flow rate of $SF_6$, expressed in sccm, is preferably about 80 to 95. Within this range, the $SF_6$ flow rate is preferably about 80 sccm, preferably greater than or equal to about 84 sccm, with greater than or equal to about 87 sccm being more preferred. Also within this range, the $SF_6$ flow rate is preferably less than or equal to about 95 sccm, preferably less than or equal to about 93%, with less than or equal to about 90% being more preferred.

The flow rate of $O_2$, expressed in sccm, is preferably about 5 to about 20. Within this range, the $O_2$ flow rate is preferably greater than or equal to about 5 sccm, preferably greater than or equal to about 7 sccm, with greater than or equal to about 8 sccm being more preferred. Also within this range, the O$_2$ flow rate it preferably less than or equal to about 20 sccm, preferably less than or equal to about 15 sccm, with less than or equal to about 13 sccm being more preferred.

The ICP forward power used to produce the textured substrate is preferably about 5 watts to about 1 watt. Within this range, the ICP power is preferably greater than or equal to about 1 watt, preferably greater than or equal to about 1.5 watts, with greater than or equal to about 2 watts being more preferred. Also within this range, the ICP power is preferably less than or equal to about 5 watts, preferably less than or equal to about 4 watts, with less than or equal to about 3 watts being more preferred.

The ICP etching chamber is preferably operated at a pressure of about 6 mtorr to about 12 mtorr absolute pressure. Within this range, the ICP etching chamber is preferably operated at an operational pressure of greater than or equal to about 6 mtorr, preferably greater than or equal to about 7 mtorr, with greater than or equal to about 8 mtorr being more preferred. Also within this range, the ICP etching chamber is preferably operated at an operational pressure of less than or equal to about 15 mtorr, preferably less than or equal to about 12 mtorr, with less than or equal to about 10 mtorr being more preferred.

Textured Si Anode

The textured substrate disclosed herein may be used in an energy storage device, preferably as an anode for a lithium ion battery. Since four lithium atoms may complex with each atom of silicon, the theoretical capacity of a lithium ion battery is about 4,200 mHh/g. The needle-like structures of the textured substrate disclosed herein are able to accommodate the rather large expansion and subsequent contraction of the bulk Si substrate upon absorption and desorption of Li ions during charging and discharging of the battery. The large surface area of the instant textured silicon also provides for an improved kinetic rate (e.g., an improved charging rate) of a lithium ion battery comprising the instant textured substrate as an anode. In addition, the microscale and nanoscale texturing of the instant textured substrate further reduces the generation of excess solid electrolyte interphase, which up until now has inhibited the ability to produce a practical lithium battery having an operative voltage of greater than about 2.5 volts.

In an embodiment, an anode for a lithium ion battery comprises a textured substrate according to the instant disclosure. In a preferred embodiment, an anode for a lithium ion battery comprises a textured substrate comprising a base comprising silicon, the base having a plurality of needle like structures depending perpendicularly away from the base, wherein at least one of the needle like structures has a depth of greater than or equal to about 50 micrometers determined perpendicular to the base and a width of less than or equal to about 50 micrometers determined parallel to the base, wherein at least a portion of the needle like structures are formed from the base.

In an embodiment, the anode of a lithium ion battery has a capacity of greater than or equal to about 500 mAh/g, preferably greater than or equal to about 600 mAh/g, preferably greater than or equal to about 700 mAh/g, preferably greater than or equal to about 800 mAh/g, preferably greater than or equal to about 900 mAh/g, preferably greater than or equal to about 1000 mAh/g, preferably greater than or equal to about 1500 mAh/g, preferably greater than or equal to about 2000 mAh/g, preferably greater than or equal to about 2500 mAh/g, preferably greater than or equal to about 3000 mAh/g, preferably greater than or equal to about 3500 mAh/g, preferably greater than or equal to about 4000 mAh/g, preferably greater than or equal to about 4200 mAh/g.

A lithium ion battery comprising an anode, which comprises the textured substrate disclosed herein may have a specific energy of greater than or equal to about 100 Wh/kg, preferably greater than or equal to about 200 Wh/kg, preferably greater than or equal to about 300 Wh/kg, preferably greater than or equal to about 400 Wh/kg, preferably greater than or equal to about 500 Wh/kg, preferably greater than or equal to about 600 Wh/kg, preferably greater than or equal to about 700 Wh/kg, preferably greater than or equal to about 800 Wh/kg, preferably greater than or canal to about 900 Wh/kg, preferably greater than or equal to about 1000 Wh/kg.

Examples

A textured substrate was produced according to the instant disclosure to further evaluate the properties of the textured substrate.

An example of the textured substrate (10) produced according to the instant disclosure is shown in the electron micrograph of FIG. 1. As the figure shows, a plurality of needle-like structures (12) depend perpendicularly away from the base (14). The needle like structures 12 have a depth (16) of greater than or equal to about 50 micrometers determined perpendicular to base 14 and a width (18) of less than or equal to about 50 micrometers determined parallel to base 14. In this example, the depth 16 is about 120 micrometers and the width 18 is about 10 micrometers at the broadest part. As the figure also shows, the needle like structures 12 are formed from base 14 and are not separate entities attached to base 14.

The Example shown in FIG. 1 was produced using an Oxford PlasmaPro System 100 (www.oxford-instrumets.comproducts/etching-deposition-growth/tools/tools/system-100/pages/system-100.aspx.) The etch was conducted in 2 steps. The first step used created a high density stubble of black silicon across the surface. The second step employed a higher forward power to increase the depth of the etch. In addition, a greater percentage of SF$_6$ for the same reason, and less O$_2$ to decrease the amount of passivation (also to enable a deeper etch). Etch parameters for the stubble etch step were:

| | |
|---|---|
| SF$_6$ | 87 sccm |
| O$_2$ | 13 sccm |
| ICP power | 900 W |
| Forward power | 2 W |
| chamber pressure | 10 mT |
| temperature | −150° C. |
| etch time | ~10 min. |

For the second deep etch step, etch parameters were:

| | |
|---|---|
| SF$_6$ | 90 sccm |
| O$_2$ | 10% |
| ICP power | 900 sccm |
| Forward power | 3 W |
| chamber pressure | 10 mT |
| temperature | −150° C. |

The etch time for this step depends on the height of the needles desired (~150 min for 120 μm needles).

All patents and publications mentioned in the specification are indicative of the level of those skilled in the art to which the invention pertains. All patents and publications are herein incorporated by reference to the same extent as if each individual publication was specifically and individually indicated to be incorporated by reference.

It should be understood, of course, that the foregoing relates to preferred embodiments of the invention and that modifications may be made without departing from the spirit and scope of the invention as set forth in the following claims.

We claim:

1. A method of producing a textured substrate comprising the steps of ICP cryogenically etching a base substrate comprising silicon at a temperature of less than or equal to about −140° C. by contacting the surface with an inductively coupled plasma comprising $SF_6$ and $O_2$ gas, without a mask, at a pressure and for a period of time sufficient to produce a plurality of needle like structures depending perpendicularly away from the base, wherein at least one of the needle like structures has a depth of greater than or equal to about 50 micrometers determined perpendicular to the base and a width of less than or equal to about 50 micrometers determined parallel to the base.

2. The method of claim 1, wherein at least one of the needle like structures has a depth of greater than or equal to about 100 micrometers determined perpendicular to the base.

3. The method of claim 1, wherein at least one of the needle like structures has a depth of greater than or equal to about 120 micrometers determined perpendicular to the base.

4. The method of claim 1, wherein the base comprises crystalline silicon.

5. The method of claim 1, wherein the base comprises amorphous silicon or polysilicon.

6. The method of claim 1, wherein the base further comprises at least one additional element selected from Groups 1 to 17 of the periodic table.

7. The method of claim 1, wherein the steps of ICP cryogenically etching a base substrate comprising silicon at a temperature of less than or equal to about −140° C. by contacting the surface with an inductively coupled plasma comprising $SF_6$ and $O_2$ gas, without a mask, at a pressure and for a period of time sufficient to produce a plurality of needle like structures depending perpendicularly away from the base comprises a first step under conditions sufficient to create a high density stubble of black silicon across the surface of the substrate followed by a second step employed a higher forward power than the first step under conditions sufficient to increase the depth of the etch relative to the first step.

* * * * *

UNITED STATES PATENT AND TRADEMARK OFFICE
CERTIFICATE OF CORRECTION

PATENT NO. : 8,685,268 B1  
APPLICATION NO. : 13/895499  
DATED : April 1, 2014  
INVENTOR(S) : Karl Y. Yee and Andrew P. Homyk Page 1 of 1

It is certified that error appears in the above-identified patent and that said Letters Patent is hereby corrected as shown below:

On the title page item (54) and in the specification, col. 1, line 3, the second to last word of the title of the patent should be "CRYOGENIC"

Signed and Sealed this  
Twenty-seventh Day of May, 2014

Michelle K. Lee  
*Deputy Director of the United States Patent and Trademark Office*